US012671789B2

(12) United States Patent
Menini et al.

(10) Patent No.: US 12,671,789 B2
(45) Date of Patent: Jun. 30, 2026

(54) REAL-TIME VIDEO ENHANCEMENT

(71) Applicant: Google LLC, Mountain View, CA (US)

(72) Inventors: Anne Menini, Mountain View, CA (US); Jeya Maria Jose Valanarasu, Mountain View, CA (US); Rahul Garg, Sunnyvale, CA (US); Andeep Singh Toor, Fremont, CA (US); Xin Tong, Santa Clara, CA (US); Weijuan Xi, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 306 days.

(21) Appl. No.: 18/229,603

(22) Filed: Aug. 2, 2023

(65) Prior Publication Data

US 2025/0047806 A1 Feb. 6, 2025

(51) Int. Cl.
H04N 7/15 (2006.01)
G06T 5/70 (2024.01)
G06T 5/73 (2024.01)

(52) U.S. Cl.
CPC ............... H04N 7/15 (2013.01); G06T 5/70 (2024.01); G06T 5/73 (2024.01); *G06T 2207/10016* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 2022/0398700 A1* | 12/2022 | K S | ......................... | G06V 10/82 |
| 2023/0054129 A1* | 2/2023 | Yin | .......................... | A61B 3/12 |

OTHER PUBLICATIONS

Valanarasu, et al., "ReBotNet: Fast Real-time Video Enhancement," arXiv:2303.13504v1 [cs.CV] Mar. 23, 2023, 15 pages. https://doi.org/10.48550/arXiv.2303.13504.

* cited by examiner

*Primary Examiner* — Lennin R Rodriguezgonzalez
(74) *Attorney, Agent, or Firm* — Lowenstein Sandler LLP

(57) ABSTRACT
Methods and systems for real-time video enhancement are provided herein. A current frame of a video stream generated by a client device of a plurality of client devices participating in the video conference is identified during a video conference. An enhanced previous frame corresponding to an enhanced version of a previous frame in the video stream is identified. At least the current frame and the enhanced previous frame are provided as input to a machine-learning model. An output of the machine learning model is obtained. The output of the machine learning model indicates an enhanced current frame corresponding to an enhanced version of the current frame. The current frame is replaced with the enhanced current frame in the video stream.

20 Claims, 4 Drawing Sheets

Figure 3:
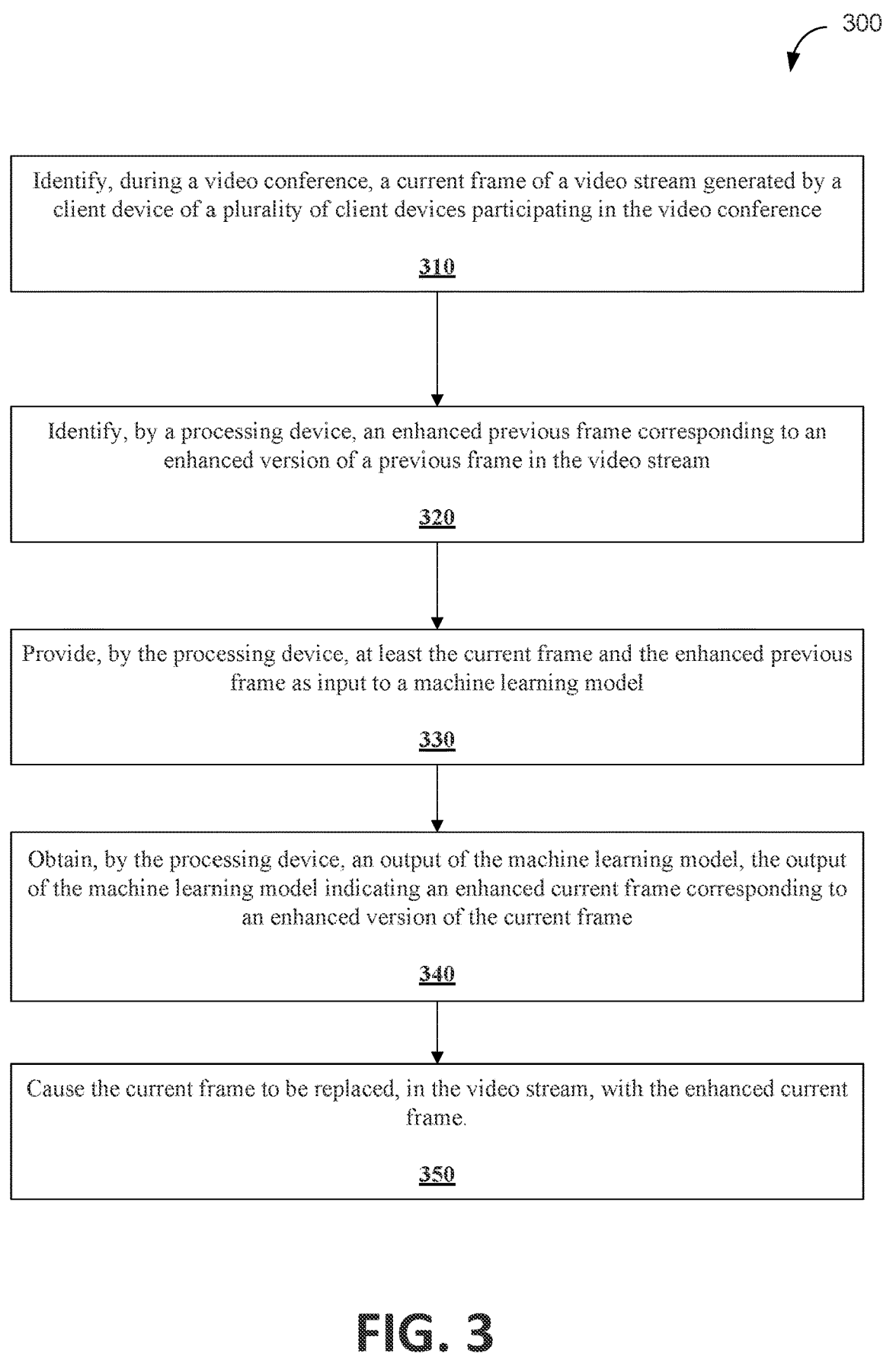

300

Identify, during a video conference, a current frame of a video stream generated by a client device of a plurality of client devices participating in the video conference

310

Identify, by a processing device, an enhanced previous frame corresponding to an enhanced version of a previous frame in the video stream

320

Provide, by the processing device, at least the current frame and the enhanced previous frame as input to a machine learning model

330

Obtain, by the processing device, an output of the machine learning model, the output of the machine learning model indicating an enhanced current frame corresponding to an enhanced version of the current frame

340

Cause the current frame to be replaced, in the video stream, with the enhanced current frame.

REAL-TIME VIDEO ENHANCEMENT

TECHNICAL FIELD

Aspects and implementations of the present disclosure relate to real-time video enhancement.

BACKGROUND

Video or audio-based conference call discussions can take place between multiple participants via a conference platform. A conference platform includes tools that allow multiple client devices to be connected over a network and share each other's audio data (e.g., voice of a user recorded via a microphone of a client device) and/or video data (e.g., a video captured by a camera of a client device, or video captured from a screen image of the client device) for efficient communication.

SUMMARY

The below summary is a simplified summary of the disclosure to provide a basic understanding of some aspects of the disclosure. This summary is not an extensive overview of the disclosure. It is intended neither to identify critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for real-time video enhancement. In an implementation, a system and method include identifying, during a video conference, a current frame of a video stream generated by a client device of a plurality of client devices participating in the video conference. The system and method further comprise identifying an enhanced previous frame corresponding to an enhanced version of a previous frame in the video stream. The system and method further comprise providing at least the current frame and the enhanced previous frame as input to a machine learning model. The system and method further comprise obtaining an output of the machine learning model, the output of the machine learning model indicating an enhanced current frame corresponding to an enhanced version of the current frame. The system and method further comprise causing the current frame to be replaced with the enhanced current frame in the video stream.

In some implementations, obtaining the output of the machine learning model comprises obtaining, using a first subnetwork of one or more layers of the machine learning model, a first set of tokens and a second set of tokens based on the current frame and the enhanced previous frame; obtaining, using a second subnetwork of one or more layers of the machine learning model, a first set of encoded tokens and a second set of encoded tokens based on the first set of tokens and the second set of tokens; and obtaining, using a third subnetwork of one or more layers of the machine learning model, the enhanced current frame based on the first set of encoded tokens and the second set of encoded tokens.

In some implementations, obtaining, using the first subnetwork, a first set of tokens and a second set of tokens based on the current frame and the enhanced previous frame comprises generating, using a convolutional neural network of the first subnetwork, the first set of tokens containing spatial and temporal information associated with a combination of the current frame and the enhanced previous frame.

In some implementations, obtaining, using the second subnetwork, a first set of encoded tokens and a second set of encoded tokens comprises generating, using a first mixer layer of the second subnetwork, the first set of encoded tokens based on encoding the first set of tokens with learned spatio-temporal features; and generating, using a second mixer layer of the second subnetwork, the second set of encoded tokens based on encoding the second set of tokens with learned temporal features.

In some implementations, obtaining, using the first subnetwork, a first set of tokens and a second set of tokens based on the current frame and the enhanced previous frame comprises generating, using a first linear layer of the first subnetwork, a first set of intermediary tokens containing temporal information associated with the current frame; generating, using a second linear layer of the first subnetwork, a second set of intermediary tokens containing temporal information associated with the previous frame; and combining the first set of intermediary tokens and the second set of intermediary tokens into the second set of tokens.

In some implementations, obtaining, using the third subnetwork, the enhanced current frame based on the first set of encoded tokens and the second set of encoded tokens comprises combining the first set of encoded tokens and the second set of encoded tokens; and generating, using a decoder of the third subnetwork, the enhanced current frame based on the combination of the first set of encoded tokens and the second set of encoded tokens.

In some implementations, the machine learning model is trained to perform at least one of deblurring, denoising, or super-resolution to correct a low quality of a frame.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3 depicts a flow diagram of an example method for real-time video enhancement, in accordance with implementations of the present disclosure.

DETAILED DESCRIPTION

Figure 1:
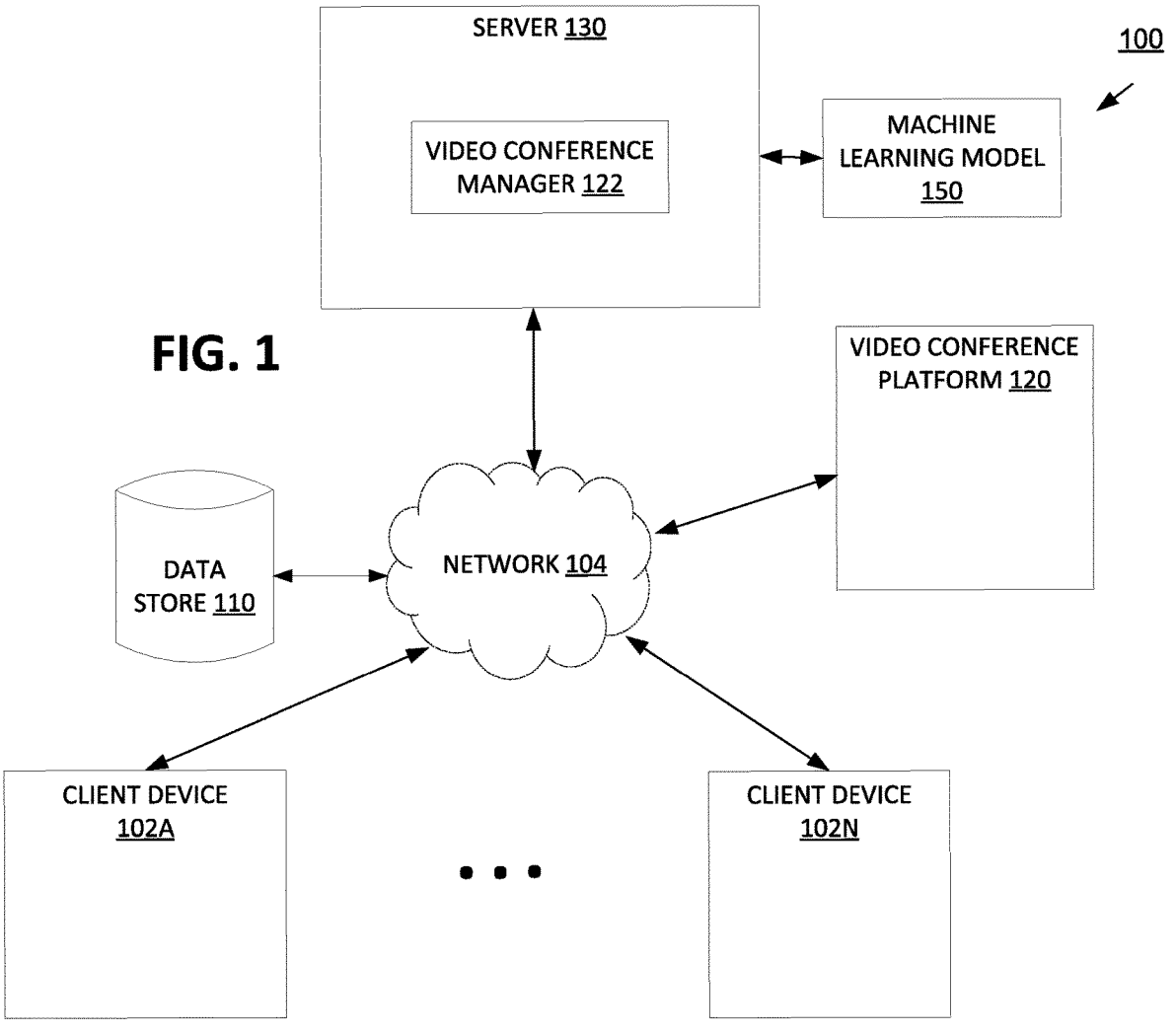
FIG. 1 illustrates an example system architecture, in accordance with implementations of the present disclosure.

Aspects of the present disclosure relate to real-time video enhancement. A conference platform can enable video or audio-based conference call discussions between multiple participants via respective client devices that are connected over a network and sharing of each other's audio data (e.g., voice of a user recorded via a microphone of a client device) and/or video data (e.g., a video captured by a camera of a client device) during a conference call. In some instances, one or more participants of the conference call may generate poor-quality video data due to the low-quality camera of the client device, poor lighting conditions, bad network connection of the client device, etc. As a result, other participants may be unable to adequately gauge the non-verbal cues of one or more participants with the poor-quality video stream, thereby hindering communication and increasing fatigue among participants.

Conventionally, conferencing platforms may utilize machine learning models that use video restoration and/or video enhancement (e.g., existing video restoration/enhancement machine learning models) to address the poor-quality video stream. Such machine learning models can include convolutional neural networks (CNNs) and/or recurrent neural networks (RNNs) that address various video restoration tasks (e.g., denoising, deblurring, super-resolution, and colorization) and/or visually enhance output frames. Video denoising can refer to the process of reducing or removing noise artifacts from a video sequence caused by various factors (e.g., low-light conditions, sensor noise, compression artifacts, transmission errors, etc.) to enhance its visual quality and clarity. Video deblurring can refer to the process of reducing or removing blur from a video sequence caused by various factors (e.g., camera shake, motion blur, defocus, etc.) to improve its sharpness and visual quality. Video super-resolution can refer to the process of enhancing the spatial resolution of a low-resolution video caused by a low-quality camera to obtain a higher-resolution version with improved visual details and clarity.

Existing video restoration/enhancement machine learning models typically address one video restoration task or enhancement at a time and operate on a frame-by-frame basis during the inferencing stage, aiming to improve each individual frame. However, frame-by-frame inferencing leads to temporal instability and introduces jittery artifacts in the output videos due to the failure of the machine learning models to consider the temporal dependencies and motion information present in videos. More specifically, each frame is processed independently without taking into account the context and motion information from neighboring frames. Further, existing video restoration/enhancement machine learning models are usually computationally intensive and/or complex, requiring significant computational resources and time to process high-resolution videos frame by frame (e.g., high inferencing time). The high inferencing time increases latency of the existing video restoration/enhancement machine learning models, thereby reducing the frame rate of the video feed (e.g., output video). Therefore, existing video restoration/enhancement machine learning models are not suitable for real-time use cases, such as video conferencing.

Aspects of the present disclosure address the above and other deficiencies by providing techniques for real-time video enhancement. In some implementations, real-time video enhancement is performed using a machine learning model that may include multiple subnetworks of layers to handle enhancement of a current frame of an input video stream while leveraging the processing of a previous frame of the input video stream. In particular, a first subnetwork of one or more layers (e.g., initial layers) of the machine learning model may process the current frame of the input video stream having low quality (sub-optimal or degraded quality) generated by a client device of a participant of the conference call and the previous frame that precedes the current frame in the video stream that has been enhanced to correct a low quality. A frame can be identified as low quality if its quality does not satisfy a quality threshold condition that is based on one or more factors including a resolution being below a threshold, a number of compression artifacts being above a threshold, a noise metric being above a threshold, a blurriness metric being above a threshold, flickering/flashing metric being above a threshold, a color distortion metric being above a threshold, a stuttering metric being above a threshold, a frame drops metric being above a threshold, an aliasing metric being above a threshold, etc.

The initial layers of the machine learning model may include a convolutional block, such as a ConvNext block, and at least one fully connected layer (or linear layer), such as Vision Transformer (ViT) for each frame expected to be inputted into the machine learning model (e.g., two linear layers for the current frame and the previous frame). The current frame and the previous (enhanced) frame can be inputted into the convolutional block of the initial layers to extract and transform the input (e.g., the current frame and the previous frame) to generate tubelet tokens. Tubelet tokens can refer to tokens that are generated by analyzing both spatial and temporal (spatio-temporal) data from multiple frames (e.g., across the current frame and the previous frame). Concurrently, the current frame and the previous frame, which have different timing information (e.g., are from different time steps), can be individually inputted into separate linear layers of the initial layers to extract image tokens. For example, one of the linear layers can output image tokens associated with the current frame, and the other linear layer can output image tokens associated with the previous frame. Image tokens can be tokens that are generated by analyzing temporal data from multiple frames (e.g., across the current frame and the previous frame), thereby providing additional information on temporal features of the frames. The tokens (e.g., tubelet tokens and the image tokens from each of the linear layers) can then be provided as input to a second subnetwork of one or more layers (e.g., intermediate layers) of the machine learning model. The intermediate layers can include two mixers, one for each type of token (e.g., tubelet tokens and image tokens). A mixer can leverage both transformers and convolutional neural networks (CNNs) to capture global context using the token multi-layer perceptron (MLP) and local information using channel MLP. Tubelet tokens generated by the convolutional block of the initial layers can be inputted into a mixer of the intermediate layers to learn spatio-temporal features and image tokens generated by the linear layers of the initial layers can be inputted into a separate mixer of the intermediate layers to learn temporal features. The features (e.g., the spatio-temporal features and the temporal features) can then be passed to a third subnetwork of one or more layers (e.g., final layers) including a decoder, such as an upsampling decoder, to generate an enhanced version of the current frame (e.g., enhanced current frame). The current frame having low quality can be replaced with the enhanced current frame.

Aspects of the present disclosure provide a machine learning model architecture that can capture temporal dependencies in the video stream, simultaneously perform various video restoration and/or enhancement tasks, reduce computational complexity, and reduce memory requirements, thereby facilitating efficient real-time enhancement of a video stream.

FIG. 1 illustrates an example system architecture 100, in accordance with implementations of the present disclosure. The system architecture 100 (also referred to as "system" herein) includes client devices 102A-N, a data store 110, a conference platform 120, server machine 130, and a network 104.

In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data and/or video data in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by conference platform 120 or one or more different machines (e.g., server machines 130) coupled to the conference platform 120 via network 104.

Conference platform 120 can enable users of client devices 102A-N to connect with each other via a conference call, such as a video conference call or an audio conference call. A conference call refers to an audio-based call and/or a video-based call in which participants of the call can connect with multiple additional participants. Conference platform 120 can allow a user to join and participate in a video conference call and/or an audio conference call with other users of the platform. Although embodiments of the present disclosure refer to multiple participants (e.g., 3 or more) connecting via a conference call, it should be noted that embodiments of the present disclosure can be implemented with any number of participants connecting via the conference call (e.g., 2 or more).

The client devices 102A-N may each include computing devices such as personal computers (PCs), laptops, mobile phones, smartphones, tablet computers, netbook computers, network-connected televisions, etc. In some implementations, client devices 102A-N may also be referred to as "user devices." Each client device 102A-N can include a web browser and/or a client application (e.g., a mobile application or a desktop application). In some implementations, the web browser and/or the client application can display a user interface (UI), provided by conference platform 120 for users to access conference platform 120. For example, a user can join and participate in a video conference call or an audio conference call via a UI provided by conference platform 120 and presented by the web browser or client application.

Each client device 102A-N can include an audiovisual component that can generate audio and video data to be streamed to conference platform 120. In some implementations, the audiovisual component can include a device (e.g., a microphone) to capture an audio signal representing the speech of a user and generate audio data (e.g., an audio file) based on the captured audio signal. The audiovisual component can include another device (e.g., a speaker) to output audio data to a user associated with a particular client device 102A-N. In some implementations, the audiovisual component can also include an image capture device (e.g., a camera) to capture images and generate video data of the captured data of the captured images.

In some implementations, conference platform 120 can include a video conference manager 122. Video conference manager 122 is configured to manage a conference call between multiple users of conference platform 120. In some implementations, video conference manager 122 can provide the UI to each client device to enable users to watch and listen to each other during a conference call. Video conference manager 122 can also collect and provide data associated with the conference call to each participant of the call. For example, video conference manager 122 can detect a particular user that is talking during the conference call and provide a notification to each client device associated with the conference call, including an identifier of the particular user. In some instances, the video conference manager 122 and/or components of each respective client device 102A-N can modify the UI based on the notification.

As previously described, an audiovisual component of each client device can capture images and generate video data based on the captured images. For example, a participant in a conference call can initiate the image capture device (e.g., a camera) of the audiovisual component of the client device to capture images and generate video data. In some implementations, the client device can transmit the generated video data to video conference manager 122.

Video conference manager 122 can receive a stream of video data (e.g., video stream) during the conference call. For example, video data (e.g., frames) is provided by a client device of the participant to the video conference manager 122 in a continuous and real-time manner during the video conference call. Video conference manager 122 can identify that the video data (e.g., a current frame) provided by the client device of the participant has low (e.g., suboptimal or degraded) quality.

As previously described, low quality may correspond to low resolution, presence of compression artifacts, noise, blurriness, flickering/flashing, color distortion, stuttering, frame drops, aliasing, etc. Low resolution refers to effects that cause videos to appear pixelated and lack fine details as a result of recording with low-resolution cameras or downscaling the video during compression or transmission. Compression artifacts, such as blockiness, blurring, ringing, and mosquito noise around edges and high-motion regions, are introduced as a result of algorithms that reduce file size. Noise refers to random variations in brightness or color, affecting video quality, particularly in low-light conditions or when using various ISO settings making the video appear grainy or speckled. Blurriness refers to effects that cause videos to appear to lack sharpness and out of focus or soft as a result of camera motion during recording, incorrect focus, or limitations of the camera lens. Flickering/flashing refers to effects that cause videos to have rapid changes in brightness or color, often resulting from inconsistent lighting conditions or incorrect camera settings. Color distortions refer to effects that cause videos to include shifts in hue, saturation, or brightness as a result of improper white balance settings, color space conversions, or problems with the image capture devices. Stuttering or frame drops refers to the lack of smoothness in the video causing visible jerks or pauses as a result of inadequate network bandwidth or errors during video encoding or transmission. Aliasing refers to videos that contain high-frequency details or patterns exceeding the resolution capabilities of the image capture device, resulting in distortion or moiré patterns.

Video conference manager 122 can identify the video data having low quality (e.g., current frame) and provide it as input to machine learning model 150 to enhance the current frame in real time (e.g., without any delay or with a very insignificant delay (e.g., not exceeding 1-2 seconds or even milliseconds) while providing video data to client devices 102A-102N during the video conference. In some embodiments, video conference manager 122 can store the current frame at data store 110 as well. Video conference manager 122 can also include in the input, provided to the machine learning model 150, video data associated with a previous video data (e.g., previous frame) that has been enhanced to correct its low quality. In some embodiments, video conference manager 122 can retrieve the previous frame previously stored at data store 110. Depending on the embodiment, if the current frame is the first frame, video conference manager 122 can use the current frame as the previous frame, thereby including the current frame twice in the input provided to machine learning model 150. Machine learning model 150 can output an enhanced version of the current frame (e.g., enhanced current frame) based on the received current frame and previous frame, as described with respect to FIG. 2. Machine learning model 150 can be trained to predict (or generate) the enhanced current frame by learning both spatial and temporal features associated with the current frame and the previous frame and their inter-dependencies. Video conference manager 122 can obtain the enhanced current frame (e.g., the output of the machine learning model 150), and replace the current frame with the enhanced current frame. For example, video conference manager 122 may cause the enhanced current frame be displayed in the UI of video conference platform 120 instead of the current frame. In some embodiments, video conference manager 122 can store the enhanced current frame at data store 110 as well for use in enhancing a subsequent video data (e.g., subsequent frame).

Figure 2:
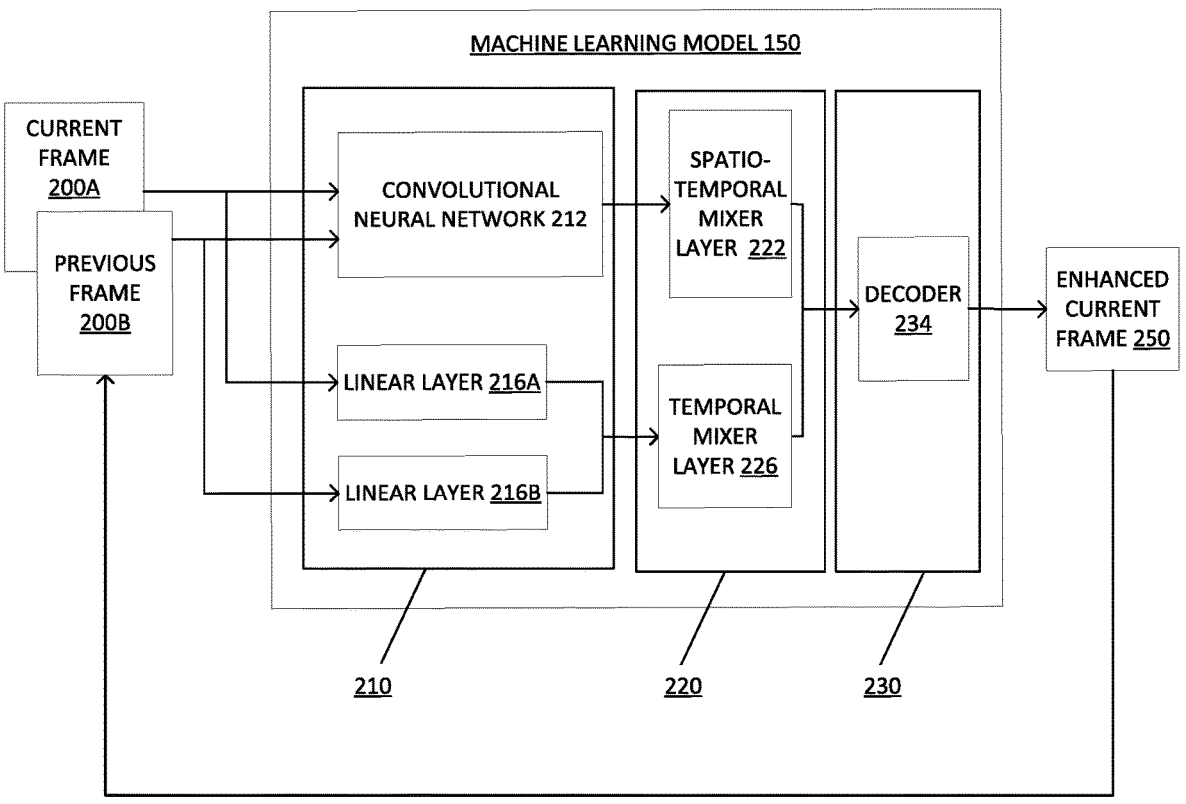
FIG. 2 is a block diagram illustrating an example machine learning model for real-time video enhancement, in accordance with implementations of the present disclosure.

FIG. 2 is a block diagram illustrating an example machine learning (ML) model 150 of FIG. 1, in accordance with implementations of the present disclosure. As described with respect to FIG. 1, ML model 150 can process a video stream of frames $x_1, x_2, \ldots, x_t$ of a certain quality and output a video stream of frames $y_1, y_2, \ldots, y_t$ of a higher (enhanced) quality, with frame $y_t$ representing an enhanced quality frame $x_t$. More specifically, during a given iteration of stream enhancement, $x_1, x_2, \ldots, x_n \rightarrow y_1, y_2, \ldots, y_n$, ML model 150 may receive input including a current frame 200A (e.g., frame $x_t$) and a previous (enhanced) frame 200B (e.g., frame $y_{t-1}$) and provide output indicating an enhanced current frame 250 (e.g., frame $y_t$) to replace the current frame 200A of the video stream ($x_t \rightarrow y_t$). In an illustrative example, machine learning model 150 can include a first subnetwork 210 of one or more layers (e.g., initial layers), a second subnetwork 220 of one or more layers (e.g., intermediate layers), and a third subnetwork 230 of one or more layers (e.g., final layers).

First subnetwork 210 can include a convolutional neural network 212 and multiple linear layers (e.g., linear layer 216A and B).

Convolutional neural network 212 may receive the current frame 200A and the previous frame 200B. In particular, the current frame 200A and the previous frame 200B are stacked across channel dimensions (e.g., stacked image). Stacking images across channel dimensions can refer to combining multiple images into a single image (e.g., stacked image), where the channel dimension represents different channels or layers of the image. That is, images can be represented as multi-dimensional arrays, often with three dimensions: height, width, and channels. The channel dimension represents different color channels or information layers in an image. For example, in an RGB image, the channel dimension has a size of 3, representing the red, green, and blue color channels. When stacking images across the channel dimension, multiple images can be concatenated or merged together, resulting in a new image with an increased number of channels.

Convolutional neural network 212 may generate tubelet tokens based on the stacked image (e.g., the current frame 200A and the previous frame 200B). In particular, the convolutional neural network 212 can treat the stacked image as a sequence of spatio-temporal regions or segments, referred to as tubelets, to analyze the temporal context and capture motion information within the stacked image. Accordingly, the convolutional neural network 212 can apply convolutional operations across both the spatial and temporal dimensions of the stacked image, thereby extracting tokens (e.g., tubelet tokens) containing information from both spatial and temporal domains.

In some embodiments, the convolutional neural network 212 may include at least one block, including a depth-wise convolution layer (DWConv), a layer normalization (LN), an initial point-wise convolution layer (PWConv), a Gaussian Error Linear Unit (GeLU), a secondary PWConv, and a downsampling block. In some embodiments, the number of blocks included in the convolutional neural network 212 may be a hyperparameter set prior to training. In some embodiments, the convolutional neural network 212 includes 4 blocks.

Parameters, such as kernel size, stride, and padding, of the DWConv may be preconfigured to increase the receptive field to give the effect of a non-local attention mechanism. In some embodiments, a kernel size can be 7×7, stride can be 1, and padding can be 3. DWConv can apply separate filters to each input channel independently to capture spatial information while maintaining the number of output channels the same as the number of input channels. The output of the DWConv is forwarded to the LN. The LN normalizes the activations (each individual output of the DWConv) along the feature dimension (also referred to as the channel or depth dimension), thus each activation within a feature map (e.g., the outputs of the DWConv) can be normalized independently of the others. The output of the LN can be forwarded to the initial PWConv.

PWConv can refer to a 1×1 convolution that focuses on individual spatial locations within the output of the LN. For example, PWConv is applied to each individual point or pixel of the input feature maps and acts as a channel-wise linear transformation to alter the channel dimension of the input. The output of the initial PWConv can be forwarded to the GeLU, which produces a smooth and continuous non-linear mapping (e.g., produces a gradual transition between different input values to ensure a smooth and continuous change in the output). The output of the GeLU can be forwarded to the secondary PWConv, which then forwards the output of the secondary PWConv to the downsampling block to reduce the spatial dimensions of feature maps. The downsampling block can output tubelet tokens that include the spatio-temporal information learned from the stacked image.

Each linear layer (e.g., linear layers 216A and B) can be a fully connected layer that generates image tokens based on an individual image (e.g., the current frame or the previous frame). In particular, each linear layer may divide the individual image into patches of equal size (e.g., tokens) to be processed through a series of transformer layers that capture global dependencies between the patches and model the relationships between them, thereby extracting image tokens containing information from the temporal domain of the individual image. The number of linear layers included in the first subnetwork 210 can be dependent on the number of frames received by machine learning model 150. In the current example, first subnetwork 210 include linear layers 216A and B, one for current frame 200A and another for previous frame 200B. Depending on the embodiment, video conference manager 122 may be configured to provide multiple previous frames (e.g., 3 previous frames) and the current frame to machine learning model 150. Accordingly, the first subnetwork 210 of machine learning model 150 can be preconfigured to include at least 4 linear layers, one for each of the multiple previous frames and one for the current frame.

The tubelet tokens associated with the stacked image outputted from the convolutional neural network 212 of the first subnetwork 210, the image tokens associated with the current image outputted from the linear layer 216A of the first subnetwork 210, and the image tokens associated with the previous image outputted from the linear layer 216B of the first subnetwork 210 can be forwarded to the second subnetwork 220.

Second subnetwork 220 can include a spatio-temporal mixer layer 222 and a temporal mixer layer 226. The mixer layer (e.g., the spatio-temporal mixer layer 222 and/or the temporal mixer layer 226) can include multiple LNs, a token multi-layer perceptron (MLP), and a channel MLP. The mixer layer can receive tokens which are normalized by the initial LN of the multiple LNs and then forwarded to the token MLP. The token MLP, similar to the channel MLP, can include multiple linear layers activated by a GeLU. The initial linear layer can convert the number of tokens or channels into an embedding dimension, while the second linear layer can convert them back to their original dimension. In some embodiments, the embedding dimension may be a hyperparameter set prior to training.

The tokens can be mixed across the token dimension, using the token MLP, which can encode the relationships between individual tokens. Token MLP can facilitate interaction and information exchange between tokens or elements in a sequence, such as their relationships and dependencies. In some embodiments, the operation (or process) of the token MLP may be represented as equation (1): $T_{TM}=MLP_{TM}$ ($LN(T_{in})$)+$T_{in}$, where $T_{TM}$ represents the tokens extracted after from $MLP_{TM}$, which represents the token MLP, and $T_{in}$ represents the input tokens.

The output of the token MLP can be normalized by a second LN of the multiple LNs and then forwarded to the channel MLP. The channel MLP can facilitate the exchange of information between different channels and/or feature maps to capture correlations or dependencies between different channels. In some embodiments, the operation (or process) of the channel MLP may be represented as equation (2): $T_{out}=MLP_{CM}$ ($LN(T_{TM})$)+$T_{TM}$, where $T_{out}$ represents the output tokens from $MLP_{CM}$ which represents the channel MLP. The output of the channel MLP (e.g., the output of the mixer layer) can be tokens that contain features learned from the relationships and dependencies between the individual tokens and the relationships and dependencies between the channels.

In some embodiments, a skip connection may be included between the input to the mixer layer and the output of the token MLP and/or the output of the token MLP and the output of the channel MLP (e.g., the output of the mixer layer).

The spatio-temporal mixer layer 222 and the temporal mixer layer 226 may have similar architecture but may be used to process different types of tokens (e.g., tubelet tokens or image tokens). For example, the spatio-temporal mixer layer 222 processes tubelet tokens to learn spatio-temporal features, while the temporal mixer layer 226 processes image tokens (e.g., the image tokens associated with the current image and the image tokens associated with the previous image collectively referred to as image tokens) to learn temporal features. In some embodiments, the number of mixers may be a hyperparameter set prior to training.

The learned features (e.g., the spatio-temporal features and the temporal features) are combined and forwarded to the third subnetwork 230. The third subnetwork 230 can include decoder 234, which generates an output based on the learned features, e.g., an enhanced current frame 250. The enhanced current frame 250 may then be used as the previous frame 200B during next frame processing (e.g., the enhanced frame $y_t$ may be used as the previous frame 200B for enhancement processing of frame $x_{t+1}$).

In the example illustration of FIG. 2, a single current frame 200A is processed together with a single enhanced previous frame 200B. In some implementations, a current frame $x_{t+1}$ may be processed together with N previous frames, $y_t$, $y_{t-1}$, . . . $y_{t-N}$. Likewise, multiple current frames, e.g., M current frames $x_{t+1}$, $x_{t+2}$, . . . $x_{t+M}$, may be processed together with N previous frames, $y_t$, $y_{t-1}$, . . . $y_{t-N}$.

The ML model 150 may be trained using one or more data sets. In some embodiments, a training data set may use public videos which are processed to restrict the frame of the video to just the face (e.g., modified videos), thereby only capturing the movement of the head. The videos may be of human and non-human representations, such as cartoons and/or avatars. The public videos may exclude those which are of very low quality. In some embodiments, a training data set may include training input video frames $x_1$, $x_2$, . . . , $x_n$ of a certain quality and target output (ground truth) video frames $y_1$, $y_2$, . . . , $y_t$, which are a higher quality than the training input frames. During training, the ML model 150 may process the training input(s) and generate training output(s), e.g., predicted enhances video frames $\hat{y}_1$, $\hat{y}_2$, . . . , $\hat{y}_n$. The difference between training outputs $\hat{y}_1$, $\hat{y}_2$, . . . , $\hat{y}_n$ and target outputs $y_1$, $y_2$, . . . , $y_t$ may be evaluated, e.g., using a suitable loss function, and parameters of the ML model 150 may be modified to reduce this difference.

The training data set may include multiple training videos. In addition, multiple videos may be used as part of a testing (or validation) data set. In one experiment, approximately 100 videos were used for training, and another 20 videos were used for testing. In some implementations, lower-quality training input video frame(s) $\{x_t\}$ may be obtained by modifying (degrading) higher-quality target output video frame(s) $\{y_t\}$. Modifying the higher-quality videos may include reducing resolution of the higher-quality videos (e.g., from 640×480 pixels per frame to 384×384 pixels per frame). Modifying the higher-quality videos may also include reducing frame rate (e.g., from 60 frames per second to 30 frames per second). Modifying the higher quality videos may include using various other techniques of degradation, such as blurring, adding compression artifacts, noise, small distortions in brightness, changing contrast, hue, saturation, and/or using any other similar techniques. In some implementations, different techniques can be applied to a given higher-quality video to produce multiple lower-quality videos to emulate diverse real-world scenarios. In some embodiments, a data set may use high definition public videos. Each high definition public video of the data set may have a resolution of at least 720p (e.g., 1280×720 pixels per frame) to emulate more natural scenes found in a video stream.

In some implementations, instead of degrading a higher-quality video $\{y_t\}$ to generate a lower-quality video $\{x_t\}$, preparation of training data sets may be performed in reverse, by enhancing a lower-quality video $\{x_t\}$ to obtain a higher-quality video $\{y_t\}$. For example, such enhancement may be achieved by a teacher machine learning model, e.g., a large model whose offline performance is not limited by any real-time processing restrictions.

FIG. 3 depicts a flow diagram of an example method 300 for real-time video enhancement, in accordance with implementations of the present disclosure. Method 300 can be performed by processing logic that can include hardware (circuitry, dedicated logic, etc.), software (e.g., instructions run on a processing device), or a combination thereof. In one implementation, some, or all of the operations of method 300 can be performed by one or more components of system 100 of FIG. 1. In some embodiments, some, or all of the operations of method 300 can be performed by ML model 150, as described above.

At block 310, processing logic identifies, during a video conference, a current frame of low quality in a video stream generated by a client device of a plurality of client devices participating in the video conference. At block 320, processing logic identifies a previous frame preceding the current frame in the video stream. Video stream refers to a stream of video data (e.g., frames) provided by a client device of a participant of the video conference. The previous frame was enhanced to correct the low quality. As previously described, a frame can be identified as low quality if its quality does not satisfy a quality threshold condition that is based on one or more factors including a resolution being below a threshold, a number of compression artifacts being above a threshold, a noise metric being above a threshold, a blurriness metric being above a threshold, flickering/flashing metric being above a threshold, a color distortion metric being above a threshold, a stuttering metric being above a threshold, a frame drops metric being above a threshold, an aliasing metric being above a threshold, etc., As previously described, the previous frame was enhanced to correct a low quality using denoising, deblurring, super-resolution, and/or colorization.

At block 330, processing logic provides the current frame and the enhanced previous frame as input to a machine learning (ML) model. At block 340, processing logic obtains an output of the machine learning model. The output of the machine learning model indicates an enhanced current frame corresponding to an enhanced version of the current frame having low quality. As previously described, the ML model can include a first subnetwork of one or more layers (e.g., initial layers), a second subnetwork of one or more layers (e.g., intermediate layers), and a third subnetwork of one or more layers (e.g., final layers).

The initial layers may include a convolutional neural network to generate a first set of tokens (e.g., tubelet tokens). The convolutional neural network can stack the current frame and the enhanced previous frame (e.g., stacked image) and treat the stacked image as a sequence of spatio-temporal regions or segments, referred to as tubelets, to analyze the temporal context and capture motion information within the stacked image. The second set of tokens (e.g., image tokens) can be generated by multiple linear layers of the initial layers (e.g., first linear layer and second linear layer), which each can generate intermediary image tokens by dividing the individual image (e.g., the current frame or the enhanced previous frame) into patches of equal size (e.g., tokens) to be processed through a series of transformer layers that capture global dependencies between the patches and model the relationships between them, thereby extracting image tokens containing information from the temporal domain of the individual image.

The first set of encoded tokens can be generated by a first mixer layer of the intermediate layers (e.g., a spatio-temporal mixer layer) based on the first set of tokens. The first set of encoded tokens contains learned spatio-temporal features. The second set of encoded tokens is generated by a second mixer layer of the intermediate layers (e.g., temporal mixer layer) based on the second set of tokens. The second set of encoded tokens contains learned temporal features. The first mixer layer and the second mixer layer may have similar architecture.

The third subnetwork of the ML model may process s the first set of encoded tokens and the second set of encoded tokens. The first set of encoded tokens and the second set of encoded tokens can be combined and forwarded to a decoder of the third subnetwork to generate the enhanced current frame.

At block 350, processing logic causes the current frame having the low quality to be replaced with the enhanced current frame in the video stream. As previously described, the processing logic can provide, to client devices of the participants of the video conference, the enhanced current frame in the video stream to cause the enhanced current frame to be displayed in the user interfaces on the client devices instead of the current frame having low quality.

Figure 4:
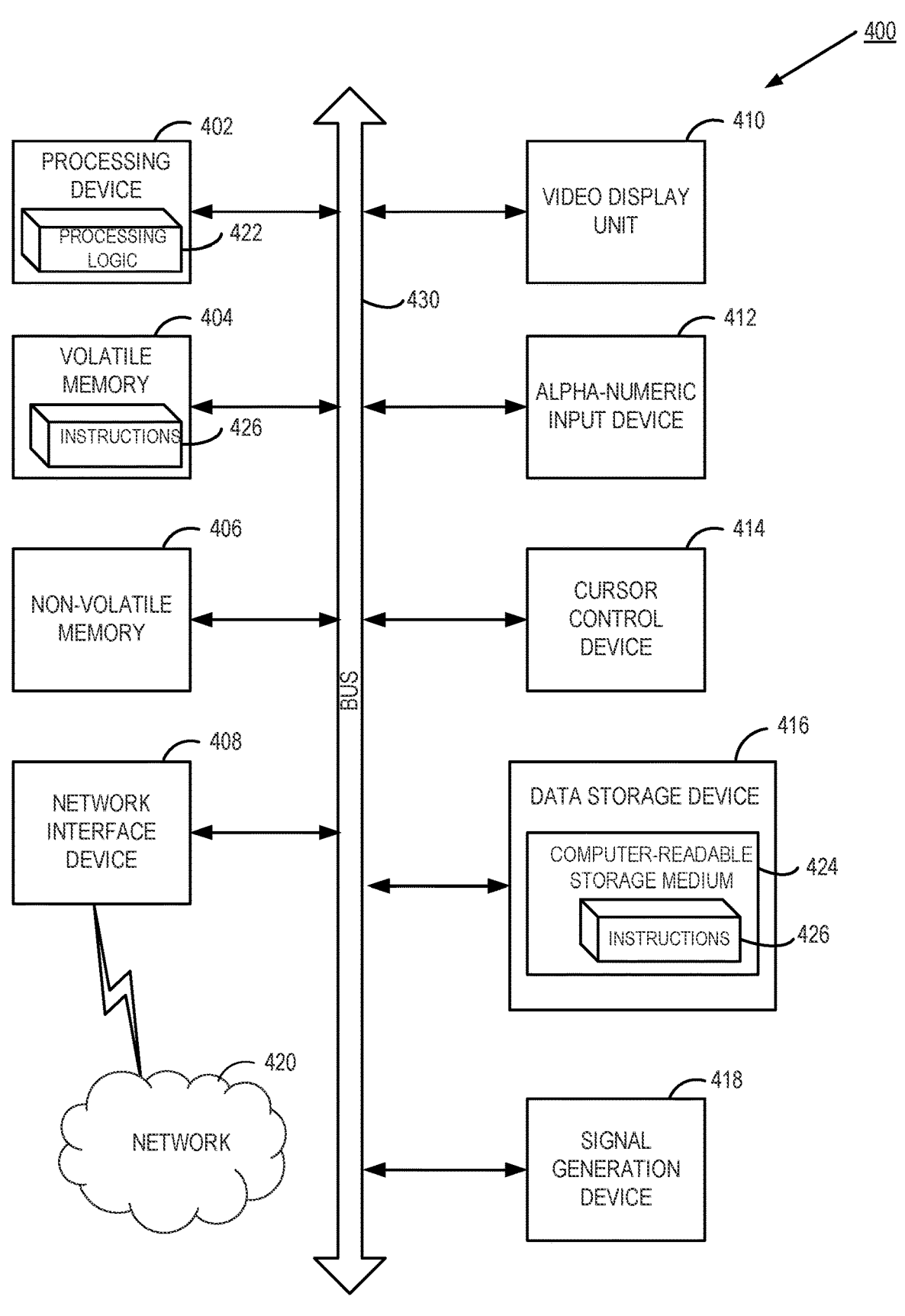
FIG. 4 is a block diagram illustrating an exemplary computer system, in accordance with implementations of the present disclosure.

FIG. 4 is a block diagram illustrating an exemplary computer system 400, in accordance with implementations of the present disclosure. The computer system 400 can correspond to platform 120 and/or client devices 102A-N, described with respect to FIG. 1. Computer system 400 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 440.

Processor (processing device) 402 represents one or more general-purpose processing devices such as a microprocessor, central processing unit, or the like. More particularly, the processor 402 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 can also be one or more special-purpose processing devices such as an application specific integrated circuit (ASIC), a field programmable gate array (FPGA), a digital signal processor (DSP), network processor, or the like. The processor 402 is configured to execute instructions 405 (e.g., for providing color recommendations for overlaid text in a video) for performing the operations discussed herein.

The computer system 400 can further include a network interface device 408. The computer system 400 also can include a video display unit 410 (e.g., a liquid crystal display (LCD) or a cathode ray tube (CRT)), an input device 412 (e.g., a keyboard, and alphanumeric keyboard, a motion sensing input device, touch screen), a cursor control device 414 (e.g., a mouse), and a signal generation device 420 (e.g., a speaker).

The data storage device 418 can include a non-transitory machine-readable storage medium 424 (also computer-readable storage medium) on which is stored one or more sets of instructions 405 (e.g., for providing color recommendations for overlaid text in a video) embodying any one or more of the methodologies or functions described herein. The instructions can also reside, completely or at least partially, within the main memory 404 and/or within the processor 402 during execution thereof by the computer system 400, the main memory 404 and the processor 402 also constituting machine-readable storage media. The instructions can further be transmitted or received over a network 430 via the network interface device 408.

In one implementation, the instructions 405 include instructions for color recommendations for overlaid text in a video. While the computer-readable storage medium 424 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding, or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

identifying, during a video conference, a current frame of a video stream generated by a client device of a plurality of client devices participating in the video conference;

identifying, by a processing device during the video conference, an enhanced previous frame corresponding to an enhanced version of a previous frame in the video stream;

providing, by the processing device during the video conference, at least the current frame and the enhanced previous frame as input to a machine learning model;

obtaining, by the processing device during the video conference, an output of the machine learning model, the output of the machine learning model indicating an enhanced current frame corresponding to an enhanced version of the current frame;

causing, during the video conference, the current frame to be replaced, in the video stream, with the enhanced current frame; and causing the video stream with the enhanced current frame to be provided for presentation on one or more of the plurality of client devices during the video conference.

2. The method of claim 1, wherein obtaining the output of the machine learning model comprises:

obtaining, using a first subnetwork of one or more layers of the machine learning model, a first set of tokens and a second set of tokens based on the current frame and the enhanced previous frame;

obtaining, using a second subnetwork of one or more layers of the machine learning model, a first set of encoded tokens and a second set of encoded tokens based on the first set of tokens and the second set of tokens; and obtaining, using a third subnetwork of one or more layers of the machine learning model, the enhanced current frame based on the first set of encoded tokens and the second set of encoded tokens.

3. The method of claim 2, wherein obtaining, using the first subnetwork, a first set of tokens and a second set of tokens based on the current frame and the enhanced previous frame comprises:

generating, using a convolutional neural network of the first subnetwork, the first set of tokens containing spatial and temporal information associated with a combination of the current frame and the enhanced previous frame.

4. The method of claim 2, wherein obtaining, using the second subnetwork, a first set of encoded tokens and a second set of encoded tokens comprises:

generating, using a first mixer layer of the second subnetwork, the first set of encoded tokens based on encoding the first set of tokens with learned spatio-temporal features; and generating, using a second mixer layer of the second subnetwork, the second set of encoded tokens based on encoding the second set of tokens with learned temporal features.

5. The method of claim 2, wherein obtaining, using the first subnetwork, a first set of tokens and a second set of tokens based on the current frame and the enhanced previous frame comprises:

generating, using a first linear layer of the first subnetwork, a first set of intermediary tokens containing temporal information associated with the current frame;

generating, using a second linear layer of the first subnetwork, a second set of intermediary tokens containing temporal information associated with the previous frame; and combining the first set of intermediary tokens and the second set of intermediary tokens into the second set of tokens.

6. The method of claim 2, wherein obtaining, using the third subnetwork, the enhanced current frame based on the first set of encoded tokens and the second set of encoded tokens comprises:

combining the first set of encoded tokens and the second set of encoded tokens; and generating, using a decoder of the third subnetwork, the enhanced current frame based on the combination of the first set of encoded tokens and the second set of encoded tokens.

7. The method of claim 1, wherein the machine learning model is trained to perform at least one of: deblurring, denoising, or super-resolution to correct a low quality of a frame.

8. A system comprising:

a memory device; and a processing device coupled to the memory device, wherein the processing device is to perform operations comprising:

identifying, during a video conference, a current frame of a video stream generated by a client device of a plurality of client devices participating in the video conference;

identifying, during the video conference, an enhanced previous frame corresponding to an enhanced version of a previous frame in the video stream;

providing, during the video conference, at least the current frame and the enhanced previous frame as input to a machine learning model;

obtaining, during the video conference, an output of the machine learning model, the output of the machine learning model indicating an enhanced current frame corresponding to an enhanced version of the current frame;

causing, during the video conference, the current frame to be replaced, in the video stream, with the enhanced current frame; and causing the video stream with the enhanced current frame to be provided for presentation on one or more of the plurality of client devices during the video conference.

9. The system of claim 8, wherein obtaining the output of the machine learning model comprises:

obtaining, using a first subnetwork of one or more layers of the machine learning model, a first set of tokens and a second set of tokens based on the current frame and the enhanced previous frame;

obtaining, using a second subnetwork of one or more layers of the machine learning model, a first set of encoded tokens and a second set of encoded tokens based on the first set of tokens and the second set of tokens; and obtaining, using a third subnetwork of one or more layers of the machine learning model, the enhanced current frame based on the first set of encoded tokens and the second set of encoded tokens.

10. The system of claim 9, wherein obtaining, using the first subnetwork, a first set of tokens and a second set of tokens based on the current frame and the enhanced previous frame comprises:

17                                                          18 generating, using a convolutional neural network of the first subnetwork, the first set of tokens containing spatial and temporal information associated with a combination of the current frame and the enhanced previous frame.

11. The system of claim 9, wherein obtaining, using the second subnetwork, a first set of encoded tokens and a second set of encoded tokens comprises:

generating, using a first mixer layer of the second subnetwork, the first set of encoded tokens based on encoding the first set of tokens with learned spatiotemporal features; and generating, using a second mixer layer of the second subnetwork, the second set of encoded tokens based on encoding the second set of tokens with learned temporal features.

12. The system of claim 9, wherein obtaining, using the first subnetwork, a first set of tokens and a second set of tokens based on the current frame and the enhanced previous frame comprises:

generating, using a first linear layer of the first subnetwork, a first set of intermediary tokens containing temporal information associated with the current frame;

generating, using a second linear layer of the first subnetwork, a second set of intermediary tokens containing temporal information associated with the previous frame; and combining the first set of intermediary tokens and the second set of intermediary tokens into the second set of tokens.

13. The system of claim 9, wherein obtaining, using the third subnetwork, the enhanced current frame based on the first set of encoded tokens and the second set of encoded tokens comprises:

combining the first set of encoded tokens and the second set of encoded tokens; and generating, using a decoder of the third subnetwork, the enhanced current frame based on the combination of the first set of encoded tokens and the second set of encoded tokens.

14. The system of claim 8, wherein the machine learning model is trained to perform at least one of: deblurring, denoising, or super-resolution to correct a low quality of a frame.

15. A non-transitory computer-readable medium comprising instructions that, responsive to execution by a processing device, cause the processing device to perform operations comprising:

identifying, during a video conference, a current frame of a video stream generated by a client device of a plurality of client devices participating in the video conference;

identifying, during the video conference, an enhanced previous frame corresponding to an enhanced version of a previous frame in the video stream;

providing, during the video conference, at least the current frame and the enhanced previous frame as input to a machine learning model;

obtaining, during the video conference, an output of the machine learning model, the output of the machine learning model indicating an enhanced current frame corresponding to an enhanced version of the current frame;

causing, during the video conference, the current frame to be replaced, in the video stream, with the enhanced current frame; and causing the video stream with the enhanced current frame to be provided for presentation on one or more of the plurality of client devices during the video conference.

16. The non-transitory computer-readable medium of claim 15, wherein obtaining the output of the machine learning model comprises:

obtaining, using a first subnetwork of one or more layers of the machine learning model, a first set of tokens and a second set of tokens based on the current frame and the enhanced previous frame;

obtaining, using a second subnetwork of one or more layers of the machine learning model, a first set of encoded tokens and a second set of encoded tokens based on the first set of tokens and the second set of tokens; and obtaining, using a third subnetwork of one or more layers of the machine learning model, the enhanced current frame based on the first set of encoded tokens and the second set of encoded tokens.

17. The non-transitory computer-readable medium of claim 16, wherein obtaining, using the first subnetwork, a first set of tokens and a second set of tokens based on the current frame and the enhanced previous frame comprises:

generating, using a convolutional neural network of the first subnetwork, the first set of tokens containing spatial and temporal information associated with a combination of the current frame and the enhanced previous frame.

18. The non-transitory computer-readable medium of claim 16, wherein obtaining, using the second subnetwork, a first set of encoded tokens and a second set of encoded tokens comprises:

generating, using a first mixer layer of the second subnetwork, the first set of encoded tokens based on encoding the first set of tokens with learned spatiotemporal features; and generating, using a second mixer layer of the second subnetwork, the second set of encoded tokens based on encoding the second set of tokens with learned temporal features.

19. The non-transitory computer-readable medium of claim 16, wherein obtaining, using the first subnetwork, a first set of tokens and a second set of tokens based on the current frame and the enhanced previous frame comprises:

generating, using a first linear layer of the first subnetwork, a first set of intermediary tokens containing temporal information associated with the current frame;

generating, using a second linear layer of the first subnetwork, a second set of intermediary tokens containing temporal information associated with the previous frame; and combining the first set of intermediary tokens and the second set of intermediary tokens into the second set of tokens.

20. The non-transitory computer-readable medium of claim 16, wherein obtaining, using the third subnetwork, the enhanced current frame based on the first set of encoded tokens and the second set of encoded tokens comprises:

combining the first set of encoded tokens and the second set of encoded tokens; and generating, using a decoder of the third subnetwork, the enhanced current frame based on the combination of the first set of encoded tokens and the second set of encoded tokens.

* * * * *